US 3,639,660
Patented Feb. 1, 1972

3,639,660
PROCESS FOR THE POLYMERISATION OF CYCLOMONOOLEFINS
Karl Nutzel, Opladen, Karl Dinges, Odenthal, and Friedrich Haas, Cologne-Buchheim, Germany, assignors to Farbenfabriken Bayer Aktiengesellschaft, Leverkusen, Germany
No Drawing. Filed Feb. 25, 1969, Ser. No. 802,241
Claims priority, application Germany, Mar. 7, 1968, P 17 20 797.5
Int. Cl. C08d 3/06; C08f 3/02
U.S. Cl. 260—82.1  7 Claims

ABSTRACT OF THE DISCLOSURE

Cycloolefins are polymerised with a catalyst comprising an organic compound of a metal of Groups IV to VI of the Periodic Table, a Friedel-Crafts catalyst and optionally an oxygen compound.

---

The polymerisation of cyclopentene with tungsten and molybdenum compounds in combination with organometallic compounds and hydrides of the metals of the Groups Ia to IIIa of the Periodic System is already known but the yields and reaction velocities have hitherto been inadequate. Although co-catalysts based on oxygen-containing and sulphur-containing compounds give better yields, an industrial process cannot be based on this catalyst system since it is recommended to avoid the use of solvents in order to avoid long induction periods and low yields. The use of solvents is, however, necessary in commercial polymerisation processes of the Ziegler-Natta type (1) in order to prevent gelling which necessitates time-consuming cleaning operations due to deposits formed on the cooling surfaces, (2) in order to control the temperature, and (3) in order to obtain advantageous flow conditions by adjusting the viscosity of the solution.

It has now been found that polymers and copolymers of cyclomonoolefines having 4 or 5 or 7 to 12 ring carbon atoms are obtained by polymerising these cycloolefines with a catalyst composed of:

(a) an organic compound of a metal taken from Groups IV to VI of the Periodic System;
(b) a Friedel-Crafts catalyst; and
(c) optionally, an oxygen compound.

Suitable comonomers for copolymerisation are up to 30% by weight of a bicyclic olefine or a conjugated diene. The polymerisation can be carried out by the usual methods of solution polymerisation or bulk polymerisation. In the case of bulk polymerisation, the monomer serves as a solvent for the catalyst. The procedure in solution is preferred.

In this context, by organic compounds of metals of Groups IVa to VIa of the Periodic System are meant the following:

(1) Compounds having metal to carbon bonds

A large proportion of these compounds can be represented by the formula:

$$Me_x^I Me_y^{IV-VI} Z_w$$

in which $Me^I$ is an alkali metal (e.g. lithium, potassium or sodium), $Me^{IV-VI}$ is a metal of Groups IVa to VIa of the Periodic System such as molybdenum, tungsten, vanadium, chromium, titanium, silicon or tin, and Z is an organic radical, for example, an aromatic radical such as phenyl or an aliphatic radical such as alkyl, or is hydrogen or is halogen, $x$ stands for the numbers 0 to 3, $y$ represents 1 or 2 and $w$ 2 to 6. Examples of compounds of this type are $Li_xWR_6$, $Na_xWR_6$, $Li_xMoR_6$ ($x=2$ or 3), $TiR_2$, $SHnR_3$, $HSnR_2Cl$, $TiR_2Cl_2$ and $AlWR_6$.

In these formulae, R denotes an alkyl or aryl radical, especially methyl, ethyl or phenyl.

The following compound is also suitable:

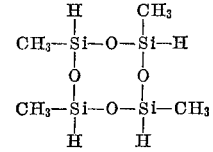

(2) π-Complexes of the metals of Groups IV to VI

These compounds may be represented by the formula:

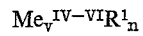

In this formula, $Me^{IV-VI}$ represents a metal of Groups IV to VI of the Periodic System as defined above, R represents an aromatic hydrocarbon (benzene) or an unsaturated aliphatic hydrocarbon (allene), $n$ is 2 to 4, $v$ is 1 or 2. Examples of such compounds are dibenzene chromium, dibenzene molybdenum, dibenzene tungsten, triallene chromium, tetraallene tungsten and diallene titanium.

By Friedel crafts catalysts are meant primarily halogen compounds (e.g. chlorine) of the elements of Groups III to VI and VIII, of the Periodic Table such as $AlCl_3$, $BF_3$, $BCl_3$, $SnCl_4$, $TiCl_4$, $VCl_4$, $WCl_6$, $MoCl_5$, $PCl_3$ and $FeCl_3$. Preferred are from group IIIa: Al, B, from IVa:Ti, from IVb: Sn, from Va:V; from Vb:P, from VIa: W, Mo from VIII:Fe.

The oxygen compounds used are preferably molecular oxygen, organic peroxides and organic hydroperoxides, for example, alkyl, alkenyl, cycloalkyl and cycloalkenyl hydroperoxide, such as 2-cyclopentenyl hydroperoxide or aromatic peroxides such as benzoyl peroxide or dicumyl peroxide. Compounds which contain hydroxyl groups, such as aliphatic alcohols, e.g. tertiary butanol, are also suitable.

The organic compounds of the metals of Groups IV to VI are used in concentrations of 0.005 to 5% based on the monomer, the Friedel-Crafts catalyst in concentrations of 0.001 to 5% and the oxygen compounds in concentrations of 0.001 to 3%.

It is preferred to use organometallic compound or complex organometallic compound and Friedel-Crafts-catalyst in a molar ratio of 0.1:2 to 2:0.1 (preferably 1.2:0.1 to 1:1).

Most preferred catalyst combinations are $HSn(C_2H_5)_3/WCl_6$; $W(alkyl)_4/SnCl_4$, $Li_3W(Phenyl)_6/BF_3$.

The monomers for the process of the invention are cyclomonoolefines having 4 to 5 or 7 to 12 carbon atoms in the ring. Examples of such monomers are cyclobutene, cyclopentene, cycloheptene, cyclooctene, cyclodecene and cyclododecene. Cylopentene is preferred. 2-methylcyclopentene may also be used. Up to 30% by weight of bicyclic or polycyclic olefines or unconjugated diolefines may be polymerised together with these monomers. Examples of such olefines are norborenes and dicyclopentadiene. Conjugated dienes having 4 to 6 carbon atoms, such as butadiene, isoprene and dimethyl butadiene may also be included in the polymerisation.

Suitable solvents are alkanes such as hexane and heptane, cycloalkanes such as cyclohexane, aromatic compounds such as benzene or toluene and chlorinated aromatic compounds such as chlorobenzene. Aromatic compounds are especially suitable. Assuming that the viscosities of the polymers are close to those suitable in practice, for example, Mooney 30–100 ML-4' (100° C.), the solvent is used in a 1 to 6 times excess based on the cyclopentene.

The temperature may be in the range of from −50° C. to +60° C. Temperatures of from −20° C. to +20° C. are preferred.

The process is preferably carried out under the protective atmosphere of an inert protective gas such as argon or pure nitrogen in order to prevent the oxidation of the organo-metallic compounds which are sensitive to oxygen and in order to obtain reproducible results.

In a preferred embodiment the polymerisation is carried out in solution in a solvent as described above. Preferably the monomer (cycloalkene) is dissolved in an excess of the solvent (ratio monomer solvent e.g. 1:5 to 1:6) with exclusion of air and moisture. Then the catalyst compounds are added. The polymerisation proceeds at a temperature of e.g. between −20 and +20° C. At the end of the polymerisation the catalyst may be deactivated, an antiageing agent is added and the polymer may be isolated by precipitation with an alcohol (methanol, isopropanol) or by steam stripping. Further drying may be effected in an extruder or by vacuum drying.

Since organic compounds of metals of Groups IV to VI of the Periodic System cause the Friedel-Crafts catalysts to react with proton-active substances such as water, alcohols and acids, the apparatus and reagents should be free from these compounds.

Polymerisation is preferably carried out by introducing the cycloalkene and the solvent into the reaction vessel, adding the catalyst component thereto and adjusting to the required polymerisation temperature.

The organo-metallic compound is generally added first and the Friedel-Crafts catalysts thereafter. If metal halides of Group VI of the Periodic System are used as Friedel-Crafts catalysts, it may be advantageous to add these first.

Before the polymer is isolated, it is advantageous to stop polymerisation with about 5%, based on the amount of monomer used, of a proton-active compound such as formic acid or methanol.

It is advisable to add a complex-forming agent at the same time which prevents the metals from remaining in the polymer after working up. Diamines and aminoalcohols such as ethylene diamine or aminoethanol are suitable for this purpose.

The product can be isolated by precipitation in 3 to 5 times the quantity of a solution of a lower alcohol in which an age-resister such as di-tertiary-butyl cresol or β-phenyl naphthylamine is dissolved before precipitation. Alternatively, the solution may be introduced into boiling water and the solvent removed with steam. In this case, the age resister must be introduced into the polymer solution together with the reaction inhibitor.

The polymers moistened with water or alcohol may be freed from the residual coagulation agents in a circulating air oven or a drying screw.

The polymerisation and working up process may, of course, be arranged to operate continuously.

Dry apparatus and reagents are invariably used in the following examples and the process is carried out under a protective gas atmosphere of pure nitrogen.

EXAMPLE 1

175 ml. of toluene and 60 ml. of cyclopentene are introduced into a 3-necked flask which is equipped with a gas-tight stirrer, a thermometer and a nitrogen feed pipe for overlaying the reaction vessel with an atmosphere of nitrogen. 2.2 g. of $Na_3W(phenyl)_6$ are then added. 0.27 g. of cyclopentenyl-2-hydroperoxide is added after 5 hours, and 0.71 g. of $SnCl_4$ is added immediately after cooling to −7° C. The temperature is maintained at about 0° C. by means of a cooling bath. The solution immediately starts to become viscous. Polymerisation is stopped after 2 hours by stirring in 3 cc. of methanol and 2 cc. of aminoethanol and the solution is poured into 5 times its quantity of methanol which contains 1% of 3,3′-dimethyl - 5,5′ - ditertiary-butyl - 6,6′ - dihydroxy-diphenylmethane. The yield is 68%=31 g. The limiting viscosity of the product is 3.8. The amount of trans bonds is 88.6%.

EXAMPLES 2–8

The examples summarised in the following table are carried out by the method described in Example 1.

TABLE

| Organic compound of metals IV–VI | Quantity (grams) | Friedel-Crafts catalyst | Quantity (grams) | Duration (hours) | Percent Yield | Percent trans-Bond | Percent cis-Bond | Limiting viscosity |
|---|---|---|---|---|---|---|---|---|
| $Li_3W(phenyl)_6$ | 2.1 | $BCl_3$ | 1.2 | 5 | 52 | 92 | 8 | 3.2 |
| $Li_3Mo(phenyl)_6$ | 1.8 | $BF_3$ | 0.8 | 5 | 43 | 62 | 48 | 2.2 |
| $Cr(C_3H_5)_3$ | 0.8 | $WCl_6$* | 0.4 | 5 | 62 | 45 | 55 | 3.4 |
| $Li_3V(phenyl)_6$ | 1.2 | $MoCl_5$* | 0.4 | 18 | 32 | 32 | 68 | 1.8 |
| $W(C_3H_5)_4$ | 0.8 | $SnCl_4$ | 0.3 | 20 | 20 | 92 | 8 | 4.8 |
| $(HSiOCH_3)_4$ | 2.4 | $WCl_6$* | 0.2 | 20 | 12 | 92.8 | 7.2 | 3.1 |
| $Ti(phenyl)_2$ | 0.8 | $WOCl_4$ | 0.3 | 20 | 28 | 90.2 | 9.8 | 3.1 |

*The Friedel-Crafts catalysts are added first and the organic compounds of the metals thereafter.

We claim:
1. A process for producing polymers of a cyclomonoolefin having 4, 5 or 7 to 12 ring carbon atoms which comprises polymerizing such cycloolefin in the presence of a catalytic amount of a catalyst comprising
(a) a compound of the formula

$$Me_x^I Me_y^{IV-VI} Z_w$$

wherein $Me^I$ is an alkali metal; $Me^{IV-VI}$ is a metal of Groups IVa to VIa of the Periodic System; Z is methyl, ethyl, phenyl or hydrogen; x is 0, 1, 2 or 3; y is 1 or 2 and w is 2, 3, 4, 5 or 6 or a π complex of the formula $$Me_v^{IV-VI} R_n^1$$

wherein $Me^{IV-VI}$ is as defined above; $R^1$ is benzene or allene; n is 2, 3 or 4 and v is 1 or 2 and
(b) a chloride of an element of groups III–VI of the Periodic System, the molar ratio of (a):(b) being 0.1:2 to 2:0.1.
2. The process of claim 1 wherein molecular oxygen, organic peroxide, organic hydroperoxide or an aliphatic alcohol is used as a further catalyst constituent.
3. The process of claim 2 wherein 2-cyclopentenyl-hydroperoxide is said further constituent.
4. The process of claim 1 wherein up to 30% by weight of bicyclic or polycyclic olefin or of a diene are employed as comonomer.
5. The process of claim 1 wherein (a) is $Li_xWR_6$, $Na_xWR_6$, $Li_xMoR_6$, $TiR_2$ and $HSnR_3$, x being 2 or 3 and R being methyl, ethyl or phenyl.
6. The process of claim 1 wherein (a) is dibenzene chromium, dibenzene molybdenum, dibenzene tungsten, triallene chromium, tetraallene tungsten or diallene titanium.
7. The process of claim 1 wherein (b) is $AlCl_3$, $BF_3$, $BCl_3$, $SnCl_4$, $TiCl_4$, $VCl_4$, $WCl_6$, $MoCl_5$, $PCl_3$ or $FeCl_3$.

References Cited

UNITED STATES PATENTS

| 3,449,310 | 6/1969 | Dall'Asta et al. | 260—93.1 |
| 3,458,489 | 7/1969 | Natta et al. | 260—93.1 |
| 3,459,725 | 8/1969 | Natta et al. | 260—93.1 |
| 3,476,728 | 11/1969 | Natta et al. | 260—93.1 |
| 3,492,278 | 1/1970 | Uraneck et al. | 260—93.1 |

JAMES A. SEIDLECK, Primary Examiner

R. A. GAITHER, Assistant Examiner

U.S. Cl. X.R.

260—88.20, 93.1